United States Patent [19]

O'Donnell et al.

[11] Patent Number: 4,612,071

[45] Date of Patent: Sep. 16, 1986

[54] MECHANICAL STRESS IMPROVEMENT PROCESS

[75] Inventors: William J. O'Donnell, Bethel Park; Jan S. Porowski, Pittsburgh, both of Pa.

[73] Assignee: O'Donnell & Associates, Inc., Pittsburgh, Pa.

[21] Appl. No.: 718,439

[22] Filed: Apr. 1, 1985

Related U.S. Application Data

[63] Continuation-in-part of Ser. No. 582,617, Feb. 22, 1984.

[51] Int. Cl.$^4$ ............................................. C21D 8/00
[52] U.S. Cl. ........................................ 148/131; 148/4
[58] Field of Search .......................... 148/131, 127, 4; 29/487

[56] References Cited

U.S. PATENT DOCUMENTS

| | | | |
|---|---|---|---|
| 3,625,568 | 12/1971 | Verdier | 29/487 |
| 4,018,634 | 4/1977 | Fencl | 148/131 |
| 4,342,609 | 8/1982 | Beatovic et al. | 148/127 |

FOREIGN PATENT DOCUMENTS

| | | | |
|---|---|---|---|
| 0014158 | 6/1980 | European Pat. Off. | |
| 1000133 | 8/1965 | United Kingdom | |
| 1097571 | 1/1968 | United Kingdom | |
| 1217803 | 12/1970 | United Kingdom | |
| 1235106 | 6/1971 | United Kingdom | |
| 2071552 | 9/1981 | United Kingdom | |
| 2048146 | 12/1982 | United Kingdom | |
| 0474564 | 9/1975 | U.S.S.R. | 148/127 |
| 0779422 | 11/1980 | U.S.S.R. | 148/127 |

*Primary Examiner*—L. Dewayne Rutledge
*Assistant Examiner*—S. Kastler
*Attorney, Agent, or Firm*—Joseph J. Carducci

[57] ABSTRACT

A process for reducing the residual welding stresses in the weld metal, heat-affected zone and in the adjacent base metal of steel piping that have been butt welded to each other end to end by means of a circumferential weld which comprises mechanically introducing compressive stresses in said weld metal, heat-affected zone and adjacent base metal higher than their individual yield strengths but not exceeding their ultimate strengths in compression.

3 Claims, No Drawings

MECHANICAL STRESS IMPROVEMENT PROCESS

This application is a continuation-in-part application of our application Ser. No. 06/582,617 for Mechanical Stress Improvement Process filed Feb. 22, 1984.

BACKGROUND OF THE INVENTION

1. Field of the Invention

This invention relates to a mechanical process for reducing residual welding stresses in the weld metal, heat-affected zone (HAZ) and in the adjacent base metal of steel piping that have been butt-welded to each other end to end by means of a circumferential weld.

2. Information Disclosure Statement

When piping are butt welded together by means of circumferential weld, significant residual tensile welding stresses are produced in the weld metal, in the heat-affected zone and in the adjacent base metal of said piping. These tensile stresses tend to enhance stress corrosion cracking at the inside surface, fatigue and creep crack propagation in the weld metal, heat-affected zone and in the adjcaent base metal of such piping.

Induction heating stress improvement (IHSI) is one method currently being used to improve residual welding stresses in pipes and shells. However, the IHSI process cannot induce net compressive forces in either the axial or circumferential directions. Equilibrium of the axial compressive stresses due to the IHSI process induces axial tensile stresses such that the net axial force in every cross-section is zero. Indeed, through-the-wall bending stresses are induced during the IHSI process. Weld defects, such as inclusions, porosity, lack of fusion, hot tears, etc., and stress corrosion or fatigue cracks are therefore subjected to high tensile stresses during the process. The resulting crack opening, fatigue damage and creep crack propagation increases exposure to the corrosive media and reduces the remaining strength and endurance of the pipe or shell walls, and makes them more susceptible to further cracking and leaking.

Our Mechanical Stress Improvement Process is an improved method in that high tensile stresses are not induced in the piping during the claimed process, thus eliminating the potential deleterious effects of these tensile stresses.

Fencl in U.S. Pat. No. 4,018,634, dated Apr. 19, 1977, produces a high-strength steel pipe by forming a mother plate into the shape of a cylinder, the longitudinal edges thereof are joined by welding, so that the resulting pipe has a continuous longitudinal weld seam, shrinks the entire pipe thus formed in the radial direction by applying compressive radial pressure to the entire outer surface of the pipe, so the pipe diameter is reduced by at least 1.5 percent, after which the pipe is heated to a temperature below the transformation temperature of the steel pipe but high enough to increase the circumferential yield stress of the entire pipe. Fencl, therefore, neither discloses nor teaches, nor is related to, the process defined and claimed herein, namely, the reduction of residual tensile welding stresses solely in the weld metal, heat-affected zone and in the adjacent base metal of piping that have been butt-welded end to end by means of a circumferential weld.

SUMMARY OF THE INVENTION

We have discovered a process for reducing residual welding stresses in the weld metal, heat-affected zone and in the adjacent base metal of piping that have been butt-welded end to end by means of a circumferential weld comprising mechanically introducing compressive stresses in said weld metal, heat-affected zone and adjacent base metal higher than the individual yield strengths of said weld metal, heat-affected zone and adjacent base metal but not exceeding their individual ultimate strengths in compression. After these compressive stresses have been applied, further application thereof is not necessary and can therefore be promptly terminated.

Our process compressive stresses, when added to the original residual welding stresses, exceed the yield strength of the material in the weld metal, heat-affected zone and adjacent base metal. This results in permanent plastic flow of the material where stresses exceed yields. When the process stresses are subsequently removed, therefore, the original residual tensile welding stresses are thus reduced.

For purposes of the process defined and claimed herein, the following definitions will provide a better understanding thereof. By "piping," we mean to include pipes, connecting fittings, such as elbows and teefittings or reducers, etc., intended to convey fluids, often under elevated pressures, from one point to another. The piping herein is made of steel, that is, of a malleable alloy of iron and carbon, usually containing other elements, such as molybdenum, nickel, chromium, manganese, etc. An example of such steel is stainless steel, such as stainless steel of the type 304, 316, 347. "Weld metal" is the metal constituting the fused zone joining the ends of two adjacent pipe ends or fittings to each other. An example of a suitable weld metal is stainless steel of the type 308. By "heat-affected zone" we mean that portion of the piping immediately adjacent to the weld metal wherein the temperature rise during welding affects the grain structure of the metal of said piping. In general, the axial length of said heat-affected zone does not exceed the wall thickness of the welded piping at the weld. The "adjacent base metal" is that portion of the piping immediately adjacent to the heat-affected zone extending axially away from the heat-affected zone a distance not exceeding $2.0\sqrt{Dt}$, where t is the wall thickness of the piping, and D is the piping diameter. By "individual yield strengths" we mean the amount of uniaxial stress required to cause permanent strain in the material exceeding 0.2 percent. By "strain," we mean the ratio of change in lengths to the undistorted lengths in some direction of the material. By "ultimate strengths in compression," insofar as piping herein is concerned, we mean the amount of stress required to cause compressive instability which may occur when the pipe diameter is reduced by an amount approaching one percent. Thus, the weldments herein after application of compressive stresses thereto, will have their diameters permanently reduced by at least 0.2 percent but less than one percent, preferably in the range of about 0.2 to about 0.8 percent. "Residual welding stresses" are those stresses that remain in a weldment without external loading after the heat energy of welding has been dissipated. The plastic deformation induced in the metal by welding heat is the principal cause of residual stresses in weldments. "Weldments" include the weld metal itself, the heat-affected zone and the adjacent base metal.

The mechanical compressive means required to obtain the results desired herein are not critical, provided such means are sufficient to induce the required circumferential compressive stresses, and, if also desired, axial, to the weld metal, heat-affected zone and adjacent base metal. In a preferred embodiment for example, the mechanical means can comprise two pairs of split rings whose inner surfaces are contoured to the outside surface of the heat-affected zones and the adjacent base metal and means for imposing the desired radial compressive deformation thereto. A means for imposing the desired compressive deformation can be obtained by providing the adjacent ends of each pair of said split rings with aligned openings and a bolt disposed in said openings through which such compressive deformation can be achieved. To obtain axial compressive stress in the weldment, each of said pairs of split rings can be provided with a pair of aligned openings in which a bolt is disposed through which the desired axial stress is obtained.

DESCRIPTION OF PREFERRED EMBODIMENT

Two lengths of 304 stainless steel pipe, each having an outer diameter of 12.750 inches and wall thickness of 0.568 inch, were butt welded to each other with a circumferential butt weld composed of 308 stainless steel. The tensile welding stresses measured at the inner surface of the pipe about 7/16 inch from the centerline of the weld at two azimuthal locations were 44.0 and 51.4 ksi (1,000 pounds per square inch) in the axial direction, and 18.2 and 12.0 ksi in the circumferential direction. These stresses are generally in accord with those commonly generated in comparable welding situations. Compressive stresses were then imposed on the weld metal, heat-affected zone and on the adjacent base metal using steel rings split in the circumferential direction and forced by an outside wedge mechanism to reduce their inner diameter. The pipe was contracted radially by about 0.5 percent on both sides of the weld at bands extending 3½ inches axial on each side of the weld. The diameter of the weldment was permanently reduced by about 0.4 percent after removal of the steel rings. The residual welding stresses were then again measured and were found to be reduced in the axial directions to compressive stresses of $-2.4$ and $-10.2$ ksi and $-23.6$ and $-24.3$ ksi in the circumferential direction.

Obviously, many modifications and variations of the invention, as hereinabove set forth, can be made without departing from the spirit and scope thereof, and therefore, only such limitations should be imposed as are indicated in the appended claims.

We claim:

1. A process for reducing the residual welding stresses in the weld metal, heat-affected zone and in the adjacent base metal of steel piping that have been buttwelded to each other end-to-end by means of a circumferential weld which comprises mechanically introducing comprises stresses in said weld metal, heat-affected zone and adjacent base metal higher than their individual yield strengths in compression in an amount sufficient to permanently reduce the diameter of the resulting pipe in the weld metal, heat-affected zone and the adjacent base metal above about 0.2 percent but below one percent using ring means split in the circumferential direction and forced by outside means to obtain said permanent reduction in diameter.

2. The process of claim 1 where the amount of compressive stresses applied to the weld metal, heat-affected zone and adjacent base metal is an amount sufficient to permanently reduce the diameter of the resulting piping in the range of about 0.2 to about 0.8 percent.

3. The process of claim 1 wherein said compressive stresses are promptly terminated after application thereof.

* * * * *

UNITED STATES PATENT AND TRADEMARK OFFICE
CERTIFICATE OF CORRECTION

PATENT NO. : 4,612,071

DATED : Sept. 16, 1986

INVENTOR(S) : William J. O'Donnell and Jan S. Porowski

It is certified that error appears in the above-identified patent and that said Letters Patent is hereby corrected as shown below:

Claim 1 was incorrectly printed and should read as follows:

A process for reducing the residual welding stresses in the weld metal, heat-affected zone and in the adjacent base metal of steel piping that have been butt-welded to each other end-to-end by means of a circumferential weld which comprises mechanically introducing compressive stresses in said weld metal, heat-affected zone and adjacent base metal higher than their individual yield strengths in compression in an amount sufficient to permanently reduce the diameter of the resulting pipe in the weld metal, heat-affected zone and the adjacent base metal above about 0.2 percent but below one percent using ring means split in the circumferential direction and forced by outside means to obtain said permanent reduction in diameter, wherein the adjacent base metal is defined as that portion of the piping immediately adjacent to the heat affected zone extending axially away from the heat-affected zone a distance not exceeding $2.0\sqrt{Dt}$, where t is the wall thickness of the

UNITED STATES PATENT AND TRADEMARK OFFICE
CERTIFICATE OF CORRECTION

PATENT NO. : 4,612,071

DATED : Sept. 16, 1986

INVENTOR(S) : William J. O'Donnell and Jan S. Porowski

It is certified that error appears in the above-identified patent and that said Letters Patent is hereby corrected as shown below:

piping and D is the pipe diameter.

Signed and Sealed this

Twenty-third Day of December, 1986

Attest:

DONALD J. QUIGG

Attesting Officer  Commissioner of Patents and Trademarks